United States Patent
Kerby (10) Patent No.: US 11,120,568 B2
(45) Date of Patent: Sep. 14, 2021

(54) METHOD AND APPARATUS FOR PRECISE MEASUREMENTS

(71) Applicant: Tower Mapping Aviation, LLC, Kennesaw, GA (US)

(72) Inventor: Lindsay Taylor Kerby, Raleigh, NC (US)

(73) Assignee: TOWER MAPPING AVIATION, LLC, Kennesaw, GA (US)

(*) Notice: Subject to any disclaimer, the term of this patent is extended or adjusted under 35 U.S.C. 154(b) by 14 days.

(21) Appl. No.: 16/354,995

(22) Filed: Mar. 15, 2019

(65) Prior Publication Data

US 2019/0287263 A1     Sep. 19, 2019

Related U.S. Application Data (60) Provisional application No. 62/643,193, filed on Mar. 15, 2018.

(51) Int. Cl.
*G06T 7/62* (2017.01)

(52) U.S. Cl.
CPC ..................... *G06T 7/62* (2017.01)

(58) Field of Classification Search
CPC ....................................................... G06T 7/62
See application file for complete search history.

(56) References Cited

U.S. PATENT DOCUMENTS

| | | | |
|---|---|---|---|
| 6,593,573 B1* | 7/2003 | McCann | F02B 7/08 250/339.01 |
| 9,075,415 B2 | 7/2015 | Ugelmass | |
| 9,235,763 B2 | 1/2016 | Joyce et al. | |
| 9,430,822 B2 | 8/2016 | Irschara et al. | |
| 9,609,288 B1* | 3/2017 | Richman | H04N 7/185 |
| 2009/0284406 A1* | 11/2009 | Comic | G01S 13/913 342/33 |
| 2011/0231038 A1* | 9/2011 | Studenny | G01S 19/20 701/17 |
| 2011/0267578 A1* | 11/2011 | Wilson | G06T 7/60 351/204 |
| 2015/0187067 A1* | 7/2015 | Bendall | G06T 17/00 382/141 |
| 2016/0070265 A1 | 3/2016 | Liu et al. | |
| 2017/0200309 A1 | 7/2017 | Qian et al. | |
| 2017/0206648 A1* | 7/2017 | Marra | G05D 1/0038 |
| 2017/0304844 A1* | 10/2017 | Shumka | B02C 25/00 |
| 2017/0337705 A1* | 11/2017 | Bendall | G06T 7/0004 |
| 2018/0109767 A1 | 4/2018 | Li et al. | |

(Continued)

OTHER PUBLICATIONS

Cali, Michele et al. 2018. "Advanced 3D Photogrammetric Surface Reconstruction of Extensive Objects by UAV Camera Image Acquisition" Sensors doi:10.3390/s18092815 (seventeen (17) pages).

(Continued)

*Primary Examiner* — Santiago Garcia
(74) *Attorney, Agent, or Firm* — Olive Law Group, PLLC (57) ABSTRACT

A point cloud model of the area of interest is generated. A known measurement coplanar to the precise measurement desired is used to define a metric image calibration constant for the picture. This image pixel to distance ratio is then used to take a linear measurement in a head on picture of the measurement of interest.

20 Claims, 9 Drawing Sheets

(56) References Cited

U.S. PATENT DOCUMENTS

2019/0279380 A1* 9/2019 Bendall ................. G01B 11/24

OTHER PUBLICATIONS

Grammens, Jorsi 2017. "Online Emergency Environment 3Dmapping Using Automated Drone Captured Images" Ghent University Department of Information Technology (seventy-four (74) pages).
Jonsson, Lars 2017. "3D Modeling of Mineshaft Using Autonomous Quad Rotor" Luleå University of Technology (eighty (81) pages).
Rosnell, Tomi et al. 2012. "Point Cloud Generation from Aerial Image Data Acquired by a Quadrocopter Type Micro Unmanned Aerial Vehicle and a Digital Still Camera" Sensors. 453-480 (twenty-eight (28) pages).

* cited by examiner

METHOD AND APPARATUS FOR PRECISE MEASUREMENTS

RELATED U.S. APPLICATION DATA

The present application claims priority to Provisional 62/643,193 filed on Mar. 15, 2018.

FIELD

The present application relates to the use of drones for precise measurements.

BACKGROUND OF THE INVENTION

Manmade structures such as cell phone towers, bridges, homes, or skyscrapers often need to be inspected during or after being built to ensure parts conform to specifications and are not in danger of failing. This also allows engineering analysis of the structural members for modification and other purposes.

Currently, to ensure that correct measurements are taken an individual must climb to the location of the bridge or tower to be measured and manually use either a tape measure, ultrasonic sensor, caliper, or other instrument known in the art to manually measure the area of interest. This has a heavy cost in both time and manual labor. Thus, there is a need in the art for a method of measurement that doesn't require manual structure climbing and measurement.

SUMMARY OF THE INVENTION

A point cloud model of the area of interest is generated. A known measurement coplanar to the precise measurement desired is used to define a metric image calibration constant for the picture. This image pixel to distance ratio is then used to take a linear measurement in a head on picture of the measurement of interest.

DETAILED DESCRIPTION

The presently disclosed subject matter is described with specificity to meet statutory requirements. However, the description itself is not intended to limit the scope of this patent. Rather, the inventors have contemplated that the subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. In another example, a computing device may be a server or other computer and communicatively connected to other computing devices (e.g. handheld devices or computers) for data analysis. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or tablet computer. A typical mobile computing device is a wireless data access enabled device (e.g. an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a convention voice communication, a given mobile device can communicate with another such device via many different types of message transfer techniques, including SMS (short message service), enhanced SMS (EMS), multi-media message (MMS), email WAP, paging, or other known or later-developed wireless data formats. Any examples shown may be implemented on any suitable computing device.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by an interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the object.

Figure 1:
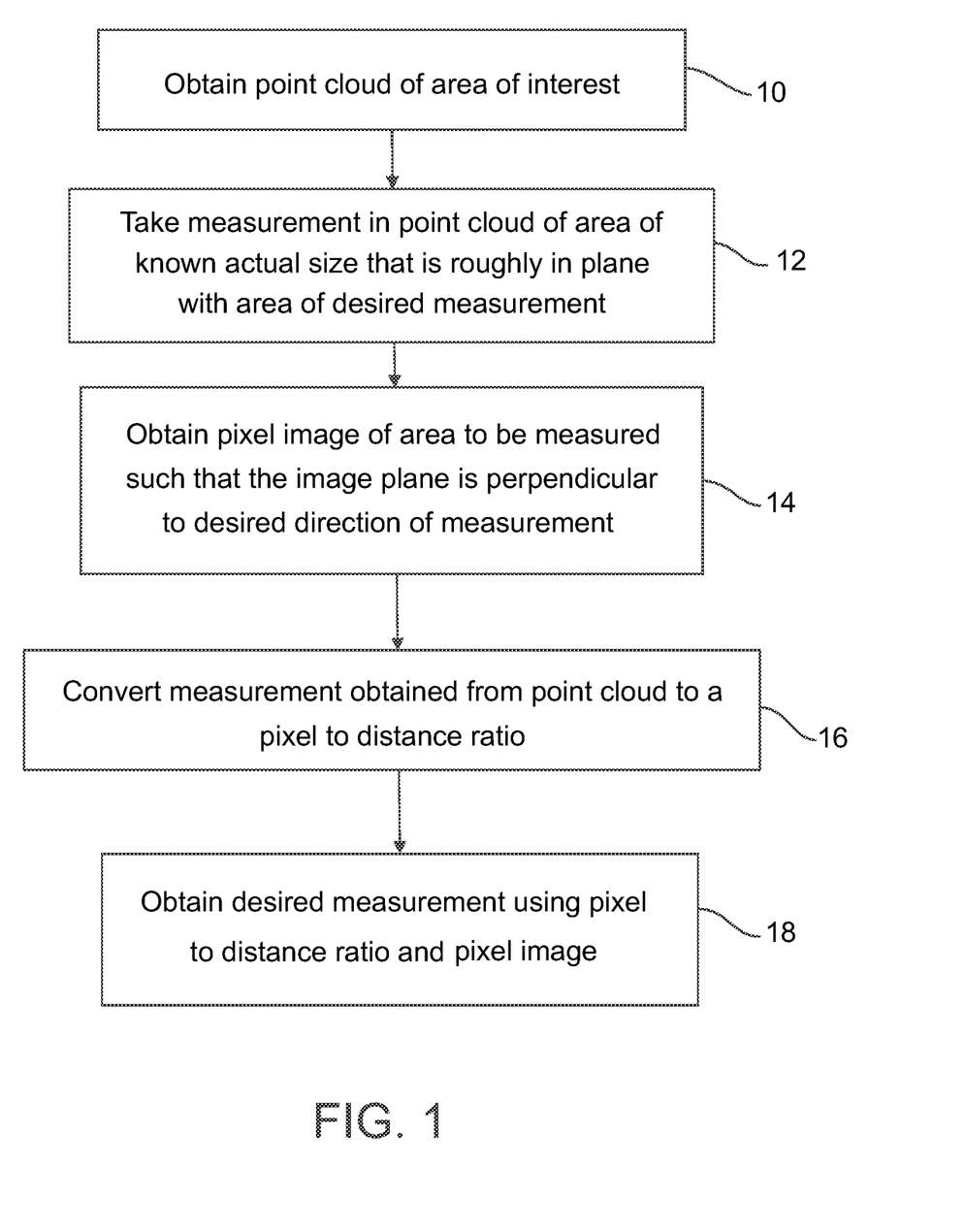
FIG. 1 is a flow chart of an embodiment of the disclosure.

A point cloud of the area of interest 10 is taken as shown in FIG. 1. In one embodiment, this image is created using multiple georeferenced photographs that in one embodiment are taken with an Unmanned Aerial Vehicle (UAV) or a drone the GPS coordinates including the precise location and complete orientation of the UAV.

For the purposes of this application the terms Unmanned Aerial Vehicle (UAV) and drone will be used interchangeably. The terms Unmanned Aerial Vehicle (UAV) or drone as used in this application includes any unmanned aerial vehicle including but not limited to drones, unpiloted aerial vehicles, remotely piloted aircraft, unmanned aircraft systems, single or multi-rotor copters (e.g. a quad copter), fixed wing aircraft, any aircraft covered under Circular 328 AN/190A, and classified by the International Civil Aviation Organization.

A section of known measurement that is roughly in the same plane as the specific measurement desired 12 is measured using photogrammetry software. In one embodiment the angle between the known and desired measurement is less than 20 degrees. In one embodiment the angle between the known and desired measurement is less than 10 degrees. In one embodiment the angle between the known and desired measurement is less than 5 degrees. In one embodiment the angle between the known and desired measurement is less than 1 degree. A separate pixel image directly facing the specific area to be measured but perpendicular to the desired direction of measurement (nadir) is taken 14. In one embodiment an 18 to 100 megapixel picture is taken using a sensor with a telephoto focal length of at least 50 mm. In an embodiment the sensor is attached to a UAV but the sensor could also be ground based. Preferably the edges of the area desired to be measured should be discernable without aliasing.

The point cloud derived measurement of the section of known measurement is converted into a pixel to distance ratio 16. The image pixel to distance ratio calculated using the point cloud image viewing and measurement software 18 is incorporated into an image processing software as a pixel to distance ratio using a computing device. The desired measurement is then measured down to $1000^{th}$ of an inch using the 18 to 100 megapixel picture taken directly facing the specific area to be measured but perpendicular to the desired direction of measurement and the pixel to distance ratio incorporated into image processing software using a computing device.

Figure 2:
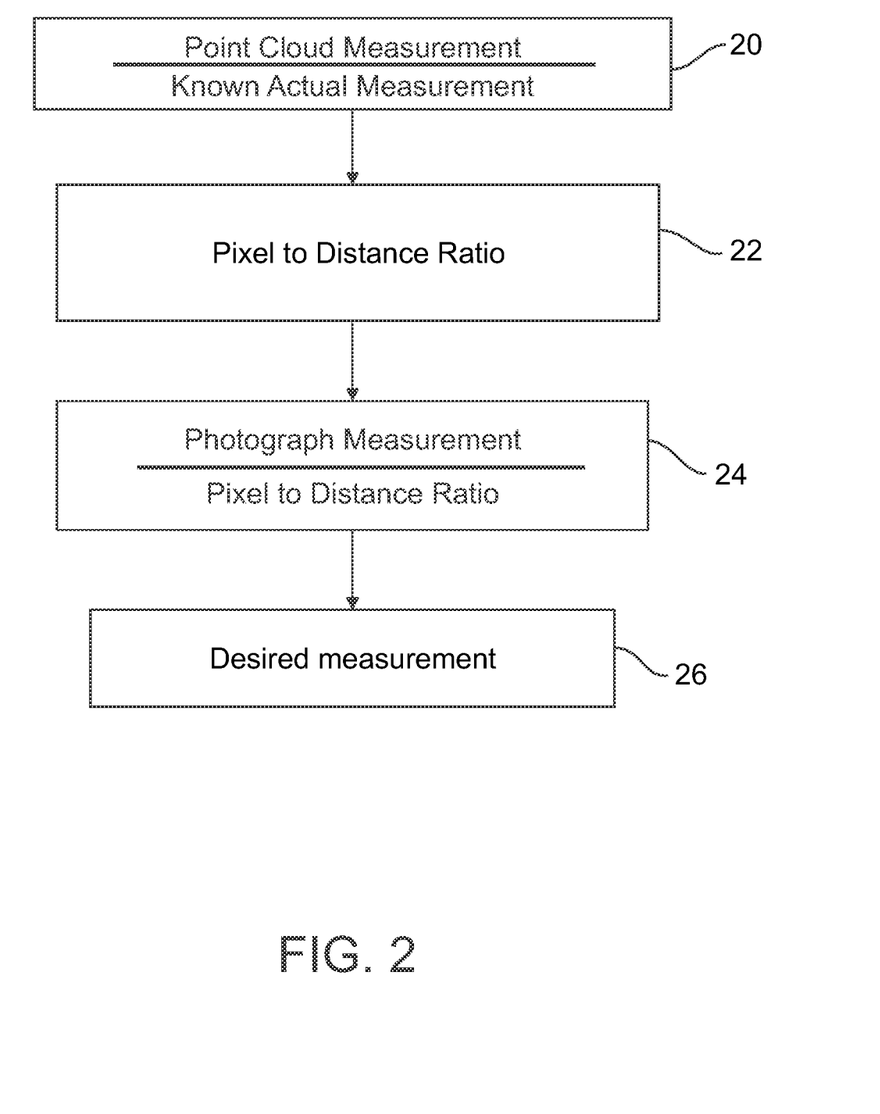
FIG. 2 is a flow chart detailing the mathematical manipulations of one embodiment of the disclosure

In one embodiment multiple point clouds are built, multiple 18 to 100-megapixel pictures of the same location are taken, and the measurement process is completed multiple times. Calculating the pixel to distance ratio and using the pixel to distance ratio to calculate the desired measurement is further described in FIG. 2. The measurement, of the area of known measurement, derived using photogrammetry software from the point cloud is divided by the actual known measurement 20 as shown below in Equation 1.

$$\frac{\text{Point Cloud Measurement}}{\text{Known Actual Measurement}} \quad \text{Equation 1}$$

The pixel to distance ratio 22 is then divided into the pixel measurement of the desired measurement area acquired from the pixel image of the desired measurement area 24 to obtain the desired measurement 26 as shown in Equation 2.

$$\frac{\text{Pixel Measurement}}{\text{Pixel to Distance ratio}} \quad \text{Equation 2}$$

Figure 3:
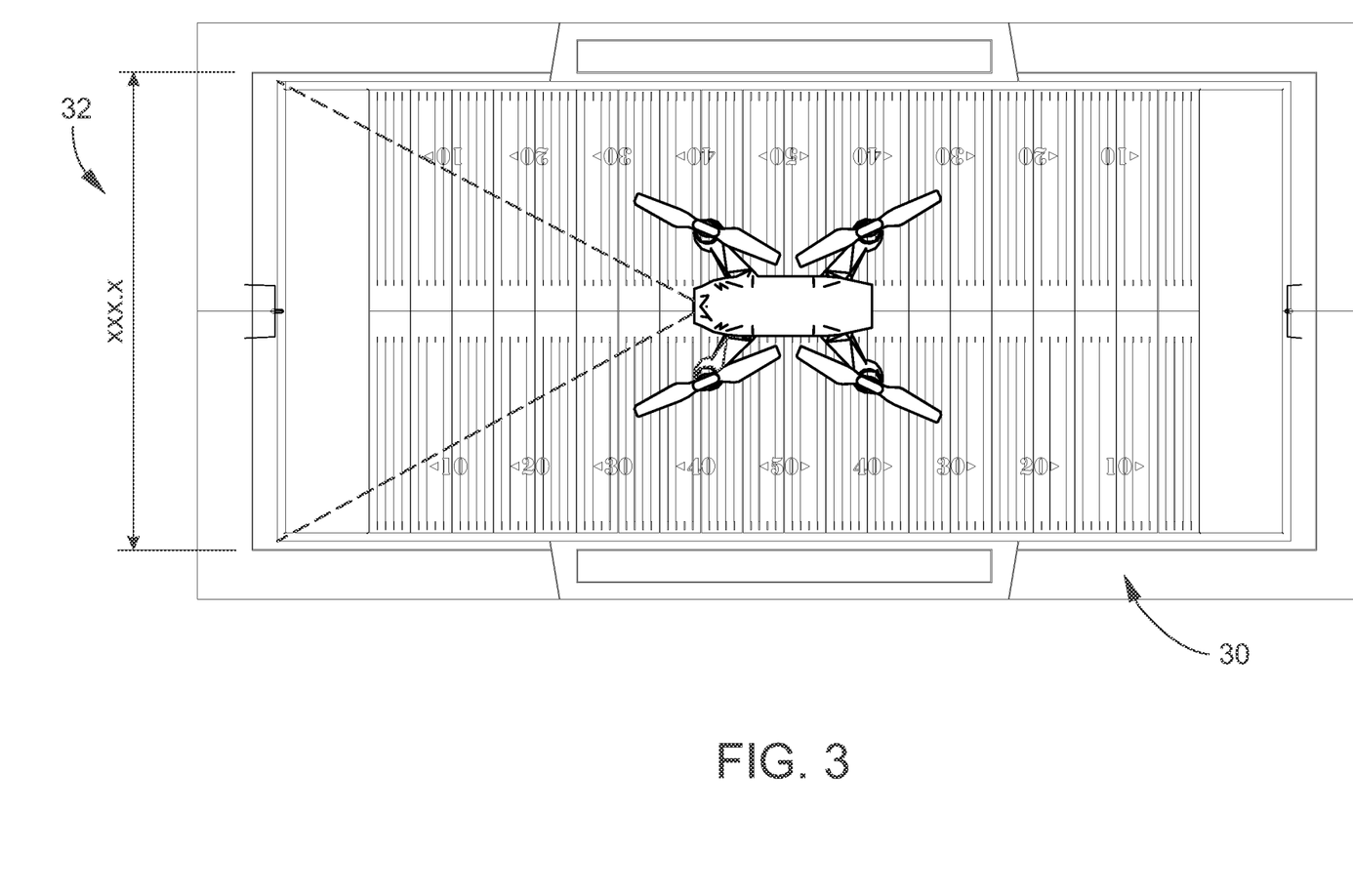
FIG. 3 is a plan view of a football field being measured by a drone in an embodiment of the disclosure
Figure 4:
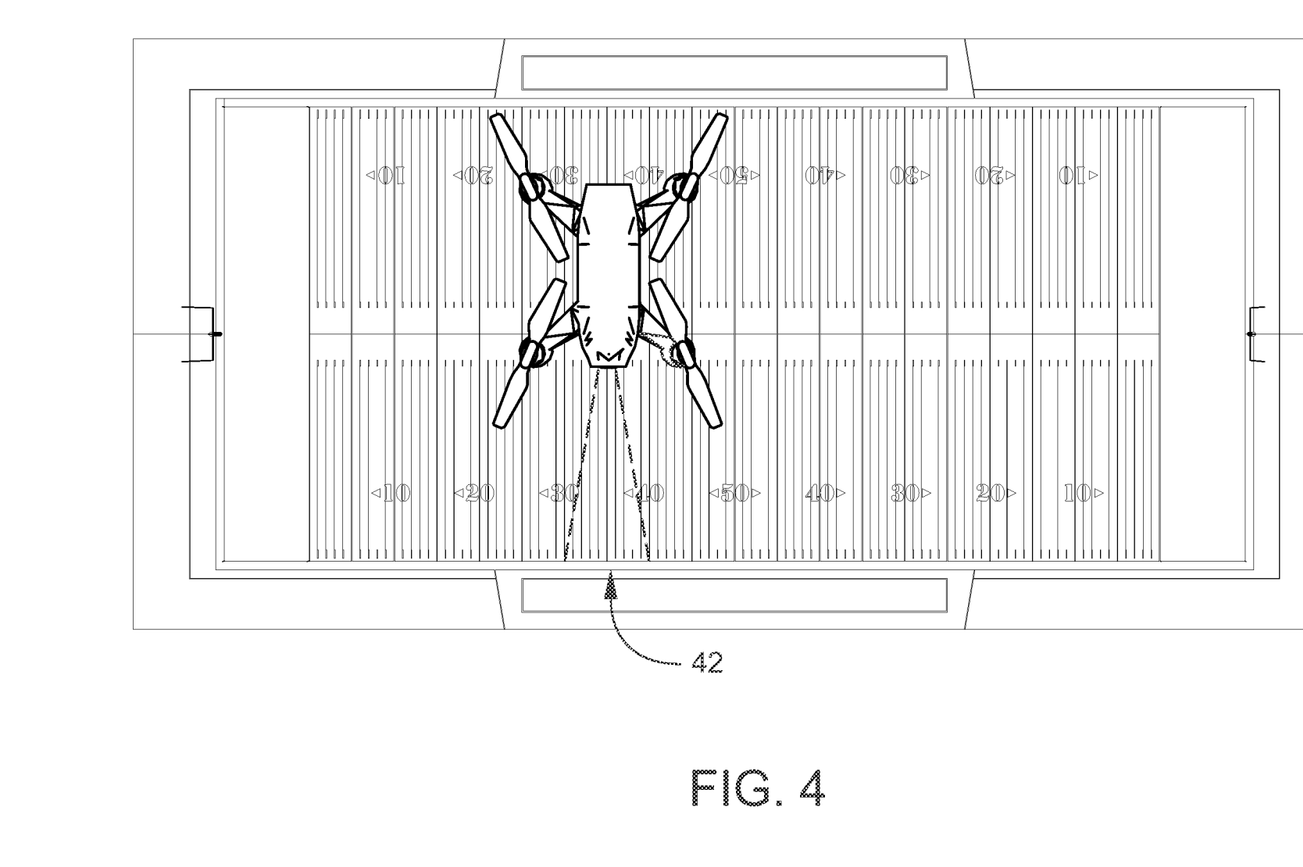
FIG. 4 is a second plan view of a football field being measured by a drone in an embodiment of the disclosure.

In an embodiment shown in FIG. 3 a drone could produce a point cloud of an American football field 30. Since the width of an American football field is known to be 160 feet it can serve as the Known Actual Measurement 32. Photogrammetry software could be used to measure a pixel distance equal to the width using known procedures 12. As football fields are generally flat this distance would be roughly in the same plane as any desired measurement. Equation one could then be used to convert the point cloud pixel distance to a pixel to distance ratio using the known American football field width 16. The same or a different drone could take a plan pixel image of the football field as shown in FIG. 4. Photogrammetry software could be used to measure a pixel distance between yard markings 42. The pixel measurement is then divided by the pixel to distance ratio 24 to obtain the desired measurement 26.

It should be noted that though pixel distance, yards, and feet are mentioned these terms are meant to include any measurement unit that could be measured using the disclosed procedures. Inches, nanometers, or any other unit that can be measured by photogrammetry software is explicitly contemplated.

Figure 5:
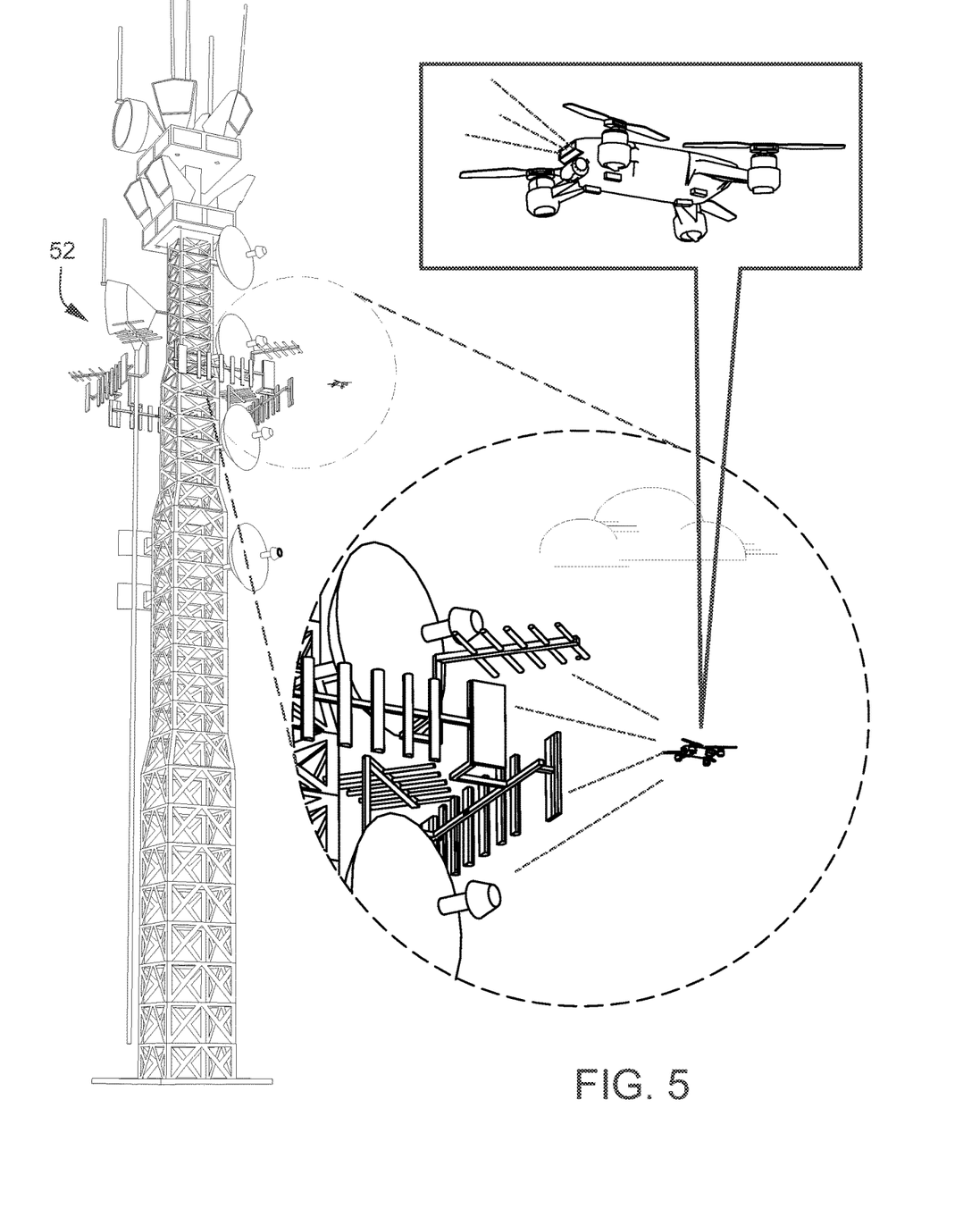
FIG. 5 is a side view of a cell phone tower being measured by a drone in an embodiment of the disclosure.
Figure 6:
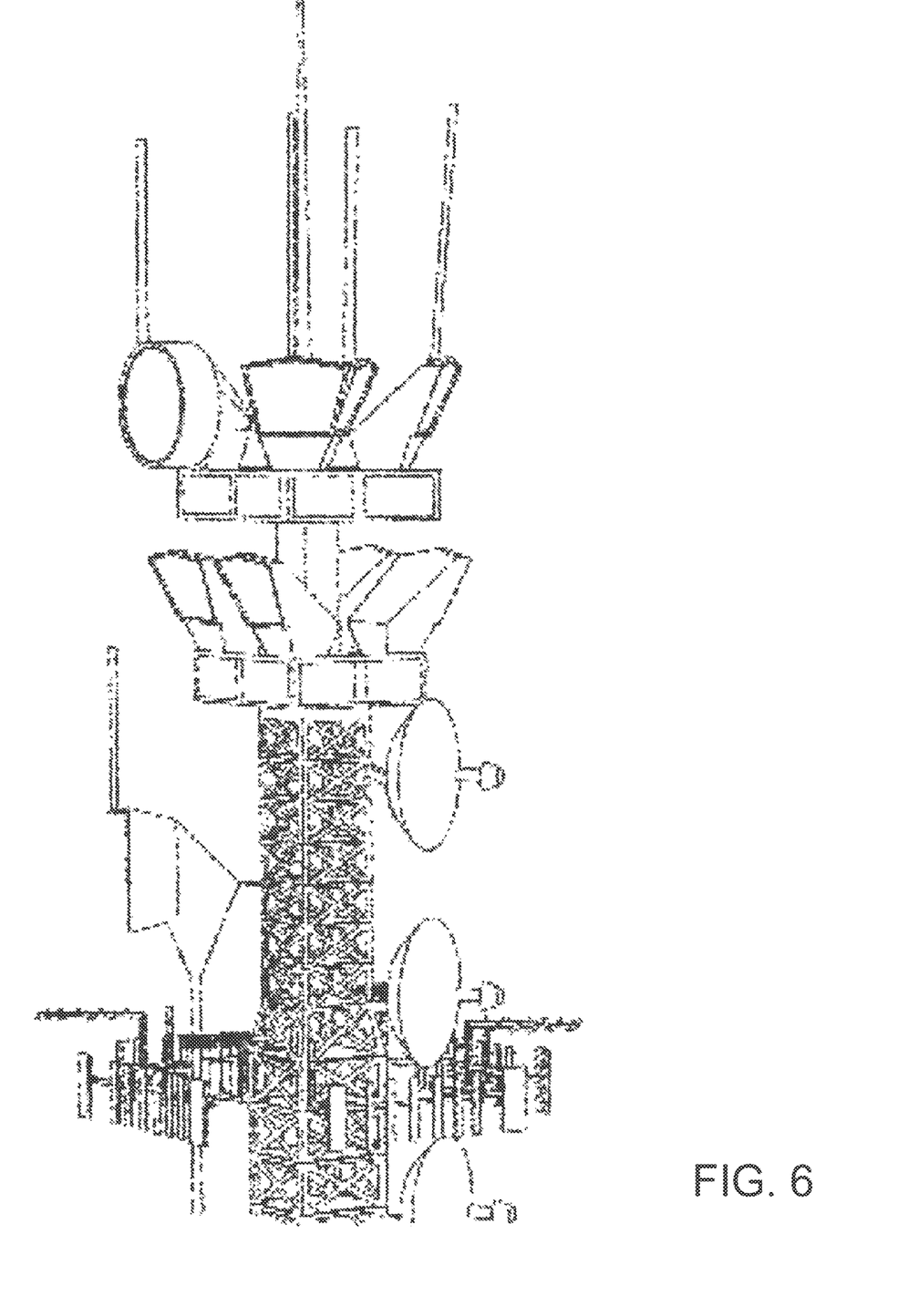
FIG. 6 is a Point Cloud of a cell phone tower used in an embodiment of the disclosure.
Figure 7:
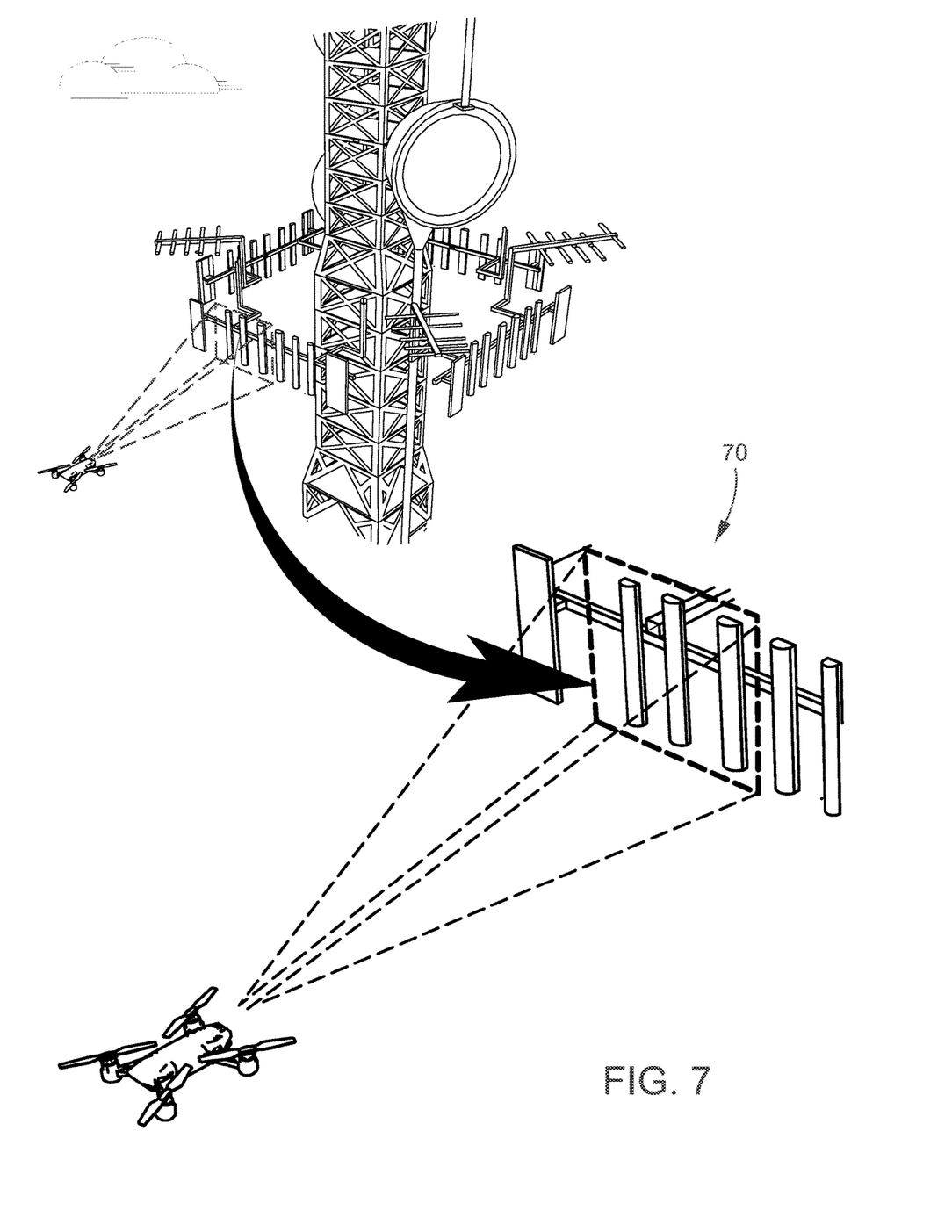
FIG. 7 is a side view of a part of a cell phone tower being photographed and measured by a drone in an embodiment of the disclosure.

In an embodiment, as shown in FIG. 5, a drone can generate a point cloud of all or part 52 of a cell phone tower. Such a point cloud is shown in FIG. 6. As shown in FIG. 7, the same or a different drone could take a pixel image of a portion of the tower 70 that could include several known and desired measurements.

Figure 8:
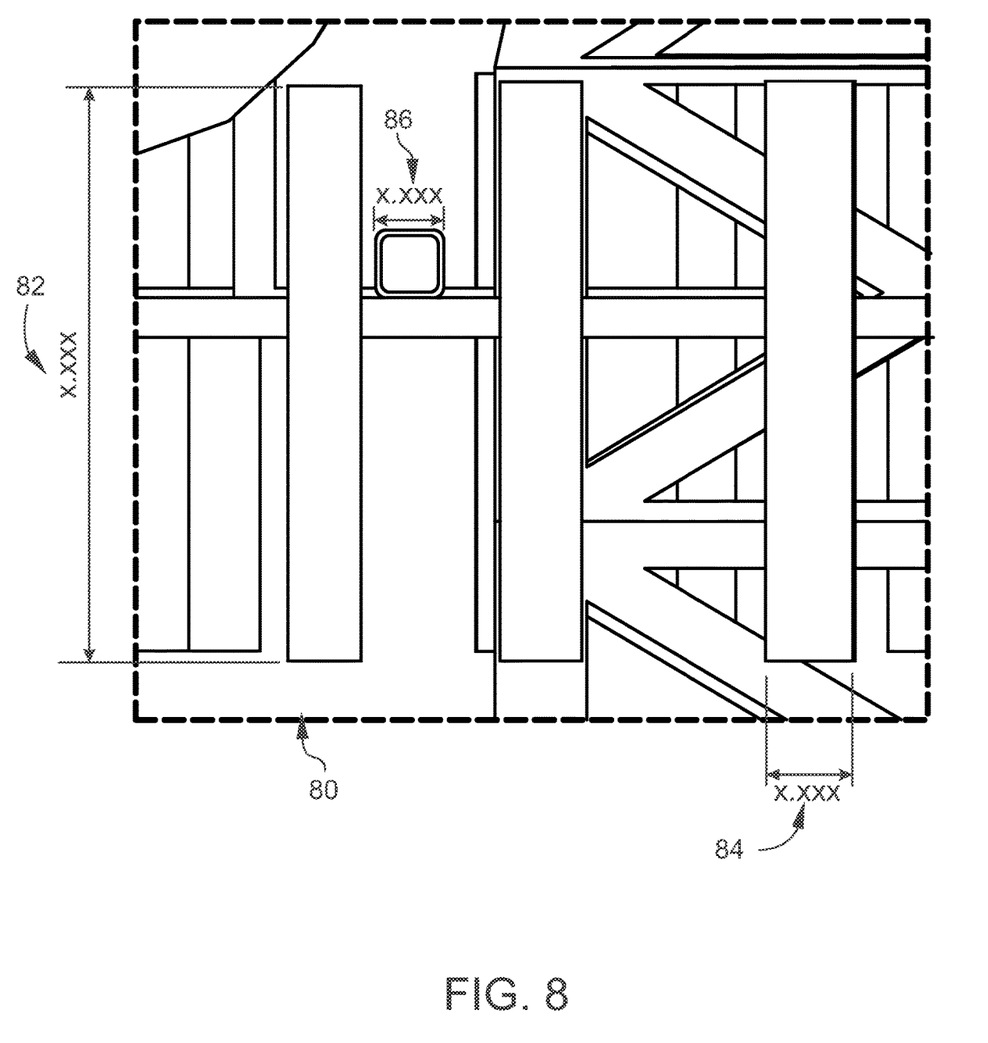
FIG. 8 is a representation of a pixel image used in an embodiment of the disclosure.

As shown in FIG. 8, Reflectors 80 for cell phone towers have a known length 82. Using this known length, it would be possible to determine the width of the reflector 84. The length of the cell phone tower reflector is measured using a point cloud image and photogrammetry software 12. The point cloud measurement is divided by the known length of the reflector 20 to obtain the pixel to distance ratio 22 using Equation 1. The width of the reflector is measured using a pixel image of the reflector taken as described previously 14. The pixel image measurement is then divided by the pixel to distance ratio using Equation 2 24 to obtain the desired measurement 26.

In another embodiment the width of the reflector obtained using the above embodiment or any other measurement method could be used to determine the width of beam 86. The width of the cell phone tower reflector 84 is measured using a point cloud image and photogrammetry software 12.

The point cloud measurement is divided by the known width of the reflector 20 to obtain the pixel to distance ratio 22 using Equation 1. The width of the beam 86 is measured using a pixel image of the beam taken as described previously. The pixel image measurement is then divided by the pixel to distance ratio using Equation 2 24 to obtain the desired measurement 26.

Figure 9:
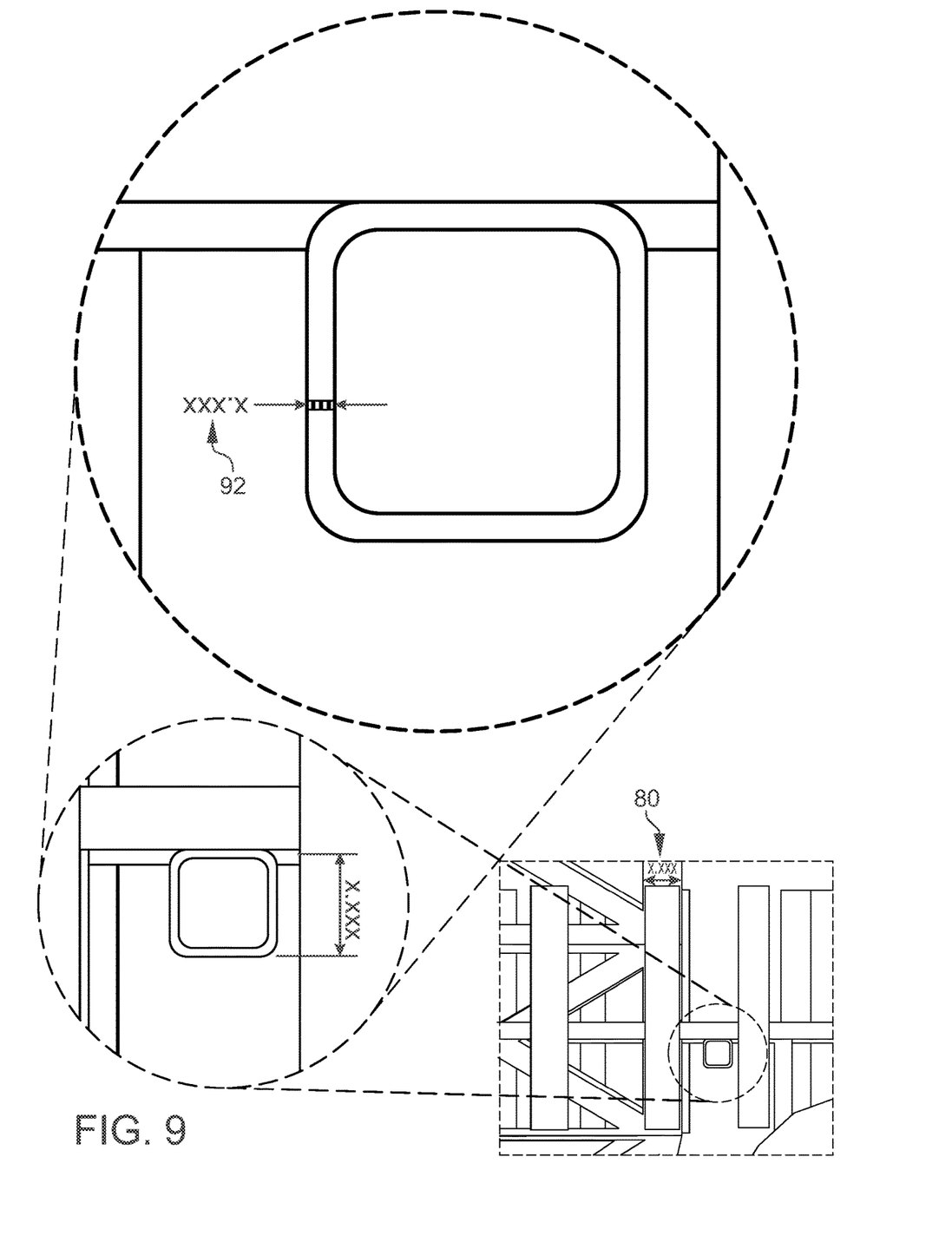
FIG. 9 is a representation of a pixel image with detailed insets used in an embodiment of the disclosure.

The disclosed method is so surprisingly and unexpectedly accurate that it can be used to measure the edge of a beam as shown in FIG. 9. The width of the cell phone tower reflector 80 is measured using a point cloud image and photogrammetry software 12. The point cloud measurement is divided by the known width of the reflector 20 to obtain the pixel to distance ratio 22 using Equation 1. The width of the beam edge 92 is measured using a pixel image of the beam taken as described previously. The pixel image measurement is then divided by the pixel to distance ratio using Equation 2 24 to obtain the desired measurement 26.

It should be noted, though specific known measurements are cited in each of the embodiments above other known measurements could have been substituted. The beam edge could have been measured using length of the reflector as the known measurement for example. The only restriction on the known measurement is that it needs to be generally in the same plane as the desired measurement.

The system may include a ground-based control system in communication with the UAV that provides flight control information and/or receives data from the UAV. The ground-based control system comprising a computing device. Alternatively, the drone could be directly piloted by a user. Whether the UAV receives flight control information from a flight control system or is directly piloted by a user, data could be directly stored on the UAV and transferred to another system at a later time. The UAV may include a separate processing system comprising a computing device attached to that UAV that may be in contact with either a ground based control system and/or a user. Further the UAV may include a separate imaging system attached to the UAV that may communicate with the processing system attached to the UAV, the ground based control system, and/or a user. In an embodiment the UAV may transmit image data collected by the attached imaging system directly to a user, to the attached processing system, and/or to the ground based control system. In an embodiment the user can control the UAV based on the transmitted imagery. The user could, for example, instruct the UAV to retake photographs if the transmitted imagery is unacceptable or to take additional photographs.

In an embodiment the UAV may include an attached storage medium including but not limited to flash memory or a disk drive which could store such items as operational commands, or captured imagery.

Communications between the UAV, the various attached systems, the user, and/or the ground-based control system could be achieved by any method currently known or later discovered. In non-limiting examples the UAV could communicate with the user, the ground based control system, and/or the various attached systems using weird connections, RF, UHF, and/or WWAN.

In an embodiment the attached imaging system may capture high resolution imagery but transmit relatively low-resolution imagery to the user, the attached processing system, and/or the ground-based control system. The high-resolution imagery may be stored on the attached storage medium and later communicated to the user, the processing system, and/or the ground-based control system.

In one embodiment a linear sticker with differently colored end indicators could be applied to the entire item precise measurements are needed of. In a preferred embodiment two lines of colored dot quadrants could be located in between the differently colored end indicators. In one possible embodiment four quadrants are present between the differently colored dots of contrasting colors with each quadrant distinct in color from the quadrant located horizontally and vertically next to it. In an alternate embodiment square or diagonal lines of known spacings and thickness are located between the differently colored end indicators.

What is claimed:

1. A method for precise measurements comprising:
   obtaining a set of data points in space related to a physical object;
   obtaining a first measured distance by measuring a first unknown distance in the set of data points in space roughly coplanar with a second unknown but desired to be measured distance;
   obtaining a pixel image containing the first unknown distance and the second unknown but desired to be measured distance in an image plane normal to the second unknown but desired to be measured distance;
   obtaining a ratio using the first measured distance obtained from the set of data points and a pixel count of the first measured distance obtained from the pixel image;
   obtaining a pixel count of the second unknown but desired to be measured distance using the pixel image;
   converting the pixel count of the second unknown but desired to be measured distance to a distance measurement using the aforementioned ratio.

2. The method of claim 1 where the set of data points in space is a point cloud.

3. The method of claim 1 where the pixel measurement of the unknown but desired distance is converted by dividing the pixel measurement of the unknown but desired distance by the ratio obtained using the measured and the known distance.

4. The method of claim 1 where the pixel image is of a resolution between 18 to 100 megapixels.

5. The method of claim 2 where the point cloud is derived from multiple georeferenced photographs.

6. A device comprising one or more processors, and a computer storage media storing instructions, that when executed by the one or more processors, cause the one or more processors to perform operation comprising:
   obtaining a set of data points in space related to a physical object;
   obtaining a first measured distance by measuring a first unknown distance in the set of data points in space roughly coplanar with a second unknown but desired to be measured distance;
   obtaining a pixel image containing the first unknown distance and the second unknown but desired to be measured distance in an image plane normal to the second unknown but desired to be measured distance;
   obtaining a ratio using the first measured distance obtained from the set of data points and a pixel count of the first measured distance obtained from the pixel image;
   obtaining a pixel count of the second unknown but desired to be measured distance using the pixel image;
   converting the pixel count of the second unknown but desired to be measured distance to a distance measurement using the aforementioned ratio.

7. The device of claim 6 where the set of data points in space is a point cloud.

8. The device of claim 6 where the pixel measurement of the unknown but desired distance is converted by dividing the pixel measurement of the unknown but desired distance by the ratio obtained using the measured and the known distance.

9. The device of claim 6 where the pixel image is of a resolution between 18 to 100 megapixels.

10. The device of claim 7 where the point cloud is derived from multiple georeferenced photographs.

11. A non-transitory computer storage medium comprising instructions that when executed by a device of one or more processors, cause the device to perform operations comprising:
   obtaining a set of data points in space related to a physical object;
   obtaining a first measured distance by measuring a first unknown distance in the set of data points in space roughly coplanar with a second unknown but desired to be measured distance;
   obtaining a pixel image containing the first unknown distance and the second unknown but desired to be measured distance in an image plane normal to the second unknown but desired to be measured distance;
   obtaining a ratio using the first measured distance obtained from the set of data points and a pixel count of the first measured distance obtained from the pixel image;
   obtaining a pixel count of the second unknown but desired to be measured distance using the pixel image;
   converting the pixel count of the second unknown but desired to be measured distance to a distance measurement using the aforementioned ratio.

12. The computer storage medium of claim 11 where the set of data points in space is a point cloud.

13. The computer storage medium of claim 11 where the pixel measurement of the unknown but desired distance is converted by dividing the pixel measurement of the unknown but desired distance by the ratio obtained using the measured and the known distance.

14. The computer storage medium of claim 11 where the pixel image is of a resolution between 18 to 100 megapixels.

15. The computer storage medium of claim 12 where the point cloud is derived from multiple georeferenced photographs.

16. A system comprising:
   a set of data points in space related to a physical object;
   a first measured distance obtained by measuring a first unknown distance in the set of data points in space roughly coplanar with a second unknown but desired to be measured distance;
   a pixel image containing the first unknown distance and the second unknown but desired to be measured distance in an image plane normal to the second unknown but desired to be measured distance;
   obtaining a ratio using the first measured distance obtained from the set of data points and a pixel count of the first measured distance obtained from the pixel image
   a pixel count of the second unknown but desired to be measured distance derived from the pixel image;
   a conversion of the pixel count of the second unknown but desired to be measured distance to a distance measurement using the aforementioned ratio.

17. The system of claim 16 where the set of data points in space is a point cloud.

18. The system of claim 16 where the pixel measurement of the unknown but desired distance is converted by dividing the pixel measurement of the unknown but desired distance by the ratio obtained using the measured and the known distance.

19. The system of claim 16 where the pixel image is of a resolution between 18 to 100 megapixels.

20. The system of claim 17 where the point cloud is derived from multiple georeferenced photographs.

* * * * *